(12) United States Patent
Dubrovsky et al.

(10) Patent No.: US 11,475,315 B2
(45) Date of Patent: Oct. 18, 2022

(54) DATA PATTERN ANALYSIS USING OPTIMIZED DETERMINISTIC FINITE AUTOMATON

(71) Applicant: SONICWALL US HOLDINGS INC., Santa Clara, CA (US)

(72) Inventors: Aleksandr Dubrovsky, San Mateo, CA (US); Justin Michael Brady, San Jose, CA (US); Roman Yanovsky, Los Altos, CA (US); Boris Yanovsky, Saratoga, CA (US)

(73) Assignee: SONICWALL INC., Milpitas, CA (US)

( * ) Notice: Subject to any disclaimer, the term of this patent is extended or adjusted under 35 U.S.C. 154(b) by 1543 days.

(21) Appl. No.: 15/445,687

(22) Filed: Feb. 28, 2017

(65) Prior Publication Data

US 2017/0178003 A1    Jun. 22, 2017

Related U.S. Application Data

(63) Continuation of application No. 14/096,866, filed on Dec. 4, 2013, now Pat. No. 9,582,756, which is a
(Continued)

(51) Int. Cl.
*G06N 5/02* (2006.01)
*G06N 5/00* (2006.01)
(Continued)

(52) U.S. Cl.
CPC ........... *G06N 5/02* (2013.01); *G06F 16/9024* (2019.01); *G06F 21/552* (2013.01); *G06N 5/00* (2013.01); *H04L 63/1416* (2013.01); *H04L 63/02* (2013.01)

(58) Field of Classification Search
CPC .................................. G06N 5/02; G06N 5/00
See application file for complete search history.

(56) References Cited

U.S. PATENT DOCUMENTS

| 5,796,942 A | 8/1998 | Esbensen |
| 5,945,933 A | 8/1999 | Kalkstein |

(Continued)

FOREIGN PATENT DOCUMENTS

| EP | 1 122 932 | 8/2001 |
| EP | 1 528 743 | 5/2005 |
| WO | WO 97/39399 | 10/1997 |

OTHER PUBLICATIONS

Aggarwal, N., "Improving the Efficiency of Network Intrusion Detection System", Indian Institute of Technology, pp. 1-40, May 3, 2006.
(Continued)

*Primary Examiner* — Kevin W Figueroa
(74) *Attorney, Agent, or Firm* — Polsinelli LLP

(57) ABSTRACT

Techniques for data pattern analysis using deterministic finite automaton are described herein. In one embodiment, a number of transitions from a current node to one or more subsequent nodes representing one or more sequences of data patterns is determined, where each of the current node and subsequent nodes is associated with a deterministic finite automaton (DFA) state. A data structure is dynamically allocated for each of the subsequent nodes for storing information associated with each of the subsequent nodes, where data structures for the subsequent nodes are allocated in an array maintained by a data structure corresponding to the current node if the number of transitions is greater than a predetermined threshold. Other methods and apparatuses are also described.

17 Claims, 12 Drawing Sheets

Related U.S. Application Data continuation of application No. 13/196,484, filed on Aug. 2, 2011, now Pat. No. 8,626,689, which is a continuation of application No. 11/778,546, filed on Jul. 16, 2007, now Pat. No. 7,991,723.

(51) Int. Cl.
*G06F 16/901* (2019.01)
*G06F 21/55* (2013.01)
*H04L 9/40* (2022.01)

(56) References Cited

U.S. PATENT DOCUMENTS

| | | | |
|---|---|---|---|
| 6,088,803 | A | 7/2000 | Tso et al. |
| 6,108,782 | A | 8/2000 | Fletcher et al. |
| 6,119,236 | A | 9/2000 | Shipley |
| 6,178,448 | B1 | 1/2001 | Gray et al. |
| 6,219,706 | B1 | 4/2001 | Fan et al. |
| 6,449,723 | B1 | 9/2002 | Elgressy et al. |
| 6,851,061 | B1 | 2/2005 | Holland et al. |
| 7,134,143 | B2 | 11/2006 | Stellenberg et al. |
| 7,152,164 | B1 | 12/2006 | Loukas et al. |
| 7,185,368 | B2 | 2/2007 | Copeland, III |
| 7,304,996 | B1 | 12/2007 | Swenson et al. |
| 7,849,502 | B1 | 12/2010 | Bloch et al. |
| 7,991,723 | B1 | 8/2011 | Dubrovsky |
| 8,626,689 | B1 | 1/2014 | Dubrovsky |
| 9,582,756 | B2 | 2/2017 | Dubrovsky |
| 2002/0083331 | A1 | 6/2002 | Krumel |
| 2003/0061361 | A1 | 3/2003 | Bacik et al. |
| 2003/0065800 | A1 | 4/2003 | Wyschogrod et al. |
| 2003/0084328 | A1 | 5/2003 | Tarquini et al. |
| 2003/0110208 | A1 | 6/2003 | Wyschogrod et al. |
| 2003/0145228 | A1 | 7/2003 | Suuronen et al. |
| 2003/0154399 | A1 | 8/2003 | Zuk et al. |
| 2004/0093513 | A1 | 5/2004 | Cantrell et al. |
| 2004/0123155 | A1 | 6/2004 | Etoh et al. |
| 2004/0199790 | A1 | 10/2004 | Lingafelt et al. |
| 2004/0255163 | A1 | 12/2004 | Swimmer et al. |
| 2005/0120243 | A1 | 6/2005 | Palmer et al. |
| 2005/0216770 | A1 | 9/2005 | Rowett et al. |
| 2005/0262556 | A1 | 11/2005 | Waisman et al. |
| 2006/0020595 | A1 | 1/2006 | Norton et al. |
| 2006/0069787 | A1 | 3/2006 | Sinclair |
| 2006/0075206 | A1* | 4/2006 | Bouchard ............ H04L 1/0045 711/202 |
| 2007/0058551 | A1 | 3/2007 | Brusotti et al. |
| 2008/0034073 | A1 | 2/2008 | McCloy et al. |
| 2008/0271147 | A1 | 10/2008 | Mohanan et al. |
| 2014/0089249 | A1 | 3/2014 | Dubrovsky |

OTHER PUBLICATIONS

Bellovin, S., "Firewall-Friendly FTP," Network Working Group, RFC No. 1579, AT&T Bell Laboratories, Feb. 1994, Http://www.ietf.org/rfc1579.txt?number=1579, downloaded Jul. 15, 2002, 4 pages.

Blyth, Andrew, "Detecting Intrusion", School of Computing, University of Glamorgan, 14 pages.

Branch, Joel, "Denial of Service Intrusion Detection Using Time Dependent Deterministic Finite Automata", RPI Graduate Research Conference 2002, Oct. 17, 2002. 7 pages.

Gateway Anti-Virus, Anti-Spyware and Intrusion Prevention Service, Unified Threat Management, Intelligent Real-time Protection, © 2005, 2 pp.

Giles, C., "Learning a Class of Large Finite State Machines with a Recurrent Neural Network", Neural Networks, vol. 8., No. 9, pp. 1359-1365, 1995.

Holzmann, G., "A Minimized Automaton Representation of Reachable States", Int J STTT 2, pp. 270-278, 1999.

Juniper Networks, "Architecture," www.juniper.net/products/intrusion/architecture.html, downloaded Jun. 11, 2004, 3 pages.

Juniper Networks, "Attack Detection," www.juniper.net/products/intrusion/detection.html, downloaded Jun. 11, 2004, 7 pages.

Juniper Networks, "Attack Prevention," www.juniper.net/products/intrusion/prevention.html, downloaded Jun. 11, 2004, 2 pages.

Juniper Networks, "Intrusion Detection and Prevention," www.juniper.net/products/intrusion/downloaded Jun. 11, 2004, 2 pages.

Juniper Networks, "Juniper Networks NetScreen-IDP 10/100/500/1000," Intrusion Detection and Prevention, Spec Sheet, Apr. 2004, 2 pages.

Lucas, S., "Learning Deterministic Finite Automata with a Smart State Labeling Evolutionary Algorithm", IEEE Transaction on Pattern Analysis and Machine Intelligence, vol. 27, No. 7, pp. 1063-1074 Jul. 2005.

Krugal, Christopher, "Using Decision Trees to Improve Signature-Based Intrusion Detection", Sep. 8, 2003, RAID 2003: recent Advance in Intrusion Detection, 20 pages.

Roberts, Paul, "NetScreen Announces Deep Inspection Firewall," IDG News Service, Oct. 20, 2003, http://www.nwfusion.com/news/2003/1020netscannou.html, downloaded Jun. 11, 2004, 5 pages.

Roesch, Martin and Green, Chris, "Snort Users Manual," Snort Release 2.0.0, M. Roesch, C. Green, Copyright 1998-2003 M. Roesch, Copyright 2001-2003 C. Green, Copyright 2003 Sourcefire, Inc. dated Dec. 8, 2003 (53 pgs).

"Snort ™: The Open Source Network Intrusion Detection System", accessed at: http://www.snort.org/about.html on Jun. 23, 2004, last updated Jun. 23, 2004, 2 pages.

SonicWALL Complete Anti-Virus, Automated and Enforced Anti-Virus Protection, © 2005, 2 pp.

SonicWALL Content Filtering Service, Comprehensive Internet Security ™,© 2005, 2 pp.

SonicWALL Content Security Manager Series, Easy-to-use, Affordable, Content Security and Internet Threat Protection, © 2006, Dec. 2006. 4 pp.

SonicWALL Endpoint Security: Anti-Virus, Automated and Enforced Anti-Virus and AntiSpyware Protection, © 2007, Mar. 2007, 2 pp.

SonicWALL Internet Security Appliances, "Content Security Manager Integrated Solutions Guide", Version 3.0, © 2007, 160 pp.

SonicWALL Internet Security Appliances, "SonicOS 3.8 Standard Administrator's Guide", © 2007, 362 pp.

SonicOS Standard 3.8.0.2 Release Notes, SonicWALL secure Anti-Virus Router 80 Series, SonicWALL, Inc., Software Release: Apr. 11, 2007, 13 pp.

"The Ultimate Internet Sharing Solution, WinProxy, User Manual," Copyright 1996-2002 Osistis Software, Inc., dated Feb. 2002 (290 pgs).

Van Engelen, R., "Constructing Finite State Automata for High-Performance XML Web Services", International Symposium on Web Services and Applications, pp. 1-7, 2004.

EP Application No. EP 04 02 5579, European Search Report dated May 23, 2005, 3 pages.

U.S. Appl. No. 11/778,546; Final Office Action dated Oct. 22, 2010.
U.S. Appl. No. 11/778,546; Office Action dated Jul. 7, 2010.
U.S. Appl. No. 13/196,484; Office Action dated Apr. 2, 2013.
U.S. Appl. No. 14/096,866; Office Action dated Apr. 21, 2016.

* cited by examiner

```
                                                                                600
typedef struct ac_pattern_state_
{
        /*
        * if is_child_array bitflag is FALSE then child should be used, else child_array should be used
        * child_array is an optimization (increases search speed, but consumes more memory)
        */ union {
                struct ac_pattern_state_ **child_array;         ~601
                struct ac_pattern_state_ *child;                ~602
                ac_pattern_state_compressed *compressed_child;  ~603
        } children;

struct ac_pattern_state_ *right_sibling;   ~604

/* fail pointer */
        struct ac_pattern_state_ *fail;    ~605

/* match data */
        void *match_data;   ~606

/* number of children that this node has */
        uint16    child_count;    ~607

/* the actual byte which is part of this pattern state */
        uint8     key;    ~608

/* this distinguishes which structure is used inside of 'union' above */
        uint8     is_child_array_present:1;   ~609

/* if true, then the child of this node is a chain */
        uint8                is_chain_present:1;   ~610

/* is this byte case-sensitive */
        uint8     is_nocase:1;    ~611

/* fail state of this state is a matching state */
        uint8     is_match_fail_state:1;    ~612

} ac_pattern_state;
```

```
typedef struct ac_pattern_state_compressed_
{
    /* identifies the size of the chain */
    uint32 len;      ~651

/* match data */
        void *match_data;   ~652

/* the sequence of bytes in the single child chain - in real code a dynamic array */
    uint8       key[LEN];   ~653

/* sequence of bitfields (such as to identify subpattern matches in the chain, etc -- in real
code a dynamic array */
    uint8       bitfields[LEN];   ~654

/* sequence of states to transition to when input does not match the next key in the
sequence -- in real code a dynamic array */
    ac_pattern_state *fail_states[LEN];   ~655

} ac_pattern_state_compressed;
```

Fig. 6B

DATA PATTERN ANALYSIS USING OPTIMIZED DETERMINISTIC FINITE AUTOMATON

CROSS-REFERENCE TO RELATED APPLICATIONS

The present application is a continuation and claims the priority benefit of U.S. patent application Ser. No. 14/096,866 filed Dec. 4, 2013, issuing as U.S. Pat. No. 9,582,756, which is a continuation and claims the priority benefit of U.S. patent application Ser. No. 13/196,484 filed Aug. 2, 2011, now U.S. Pat. No. 8,626,689, which is a continuation and claims the priority benefit of U.S. patent application Ser. No. 11/778,546 filed Jul. 16, 2007, now U.S. Pat. No. 7,991,723, the disclosures of which are incorporated herein by reference.

BACKGROUND OF THE INVENTION

Field of the Invention

The present invention relates generally to data pattern analysis. More particularly, this invention relates to data pattern analysis using deterministic finite automaton.

Description of the Related Art

Deterministic finite automaton (DFA) or deterministic finite state machine is a set of states tied together by a set of transitions, where transitions specify movement from one state to another based on some input. Thus, a deterministic finite automaton at a given state and for a given input has only one transition to a next state. Examples of such deterministic finite automaton may be designed in hardware or software to produce results based on the state and any input. Some applications for deterministic finite automaton are used in electronic systems, such as network equipment and computer operated systems, to control and run processes.

To increase the speed at which a deterministic finite automaton operates on an electronic system current systems load an array into memory for each state of the deterministic finite automaton. Each array contains information on the current state and defines what the next state will be given a certain input. As the number of states and transitions between states of a deterministic finite automaton increases the size of the array also increases. This creates the need for large amounts of memory necessary to store the information needed to execute a deterministic finite automaton. As the memory demands increase so does the cost of implementing a deterministic finite automaton.

SUMMARY OF THE PRESENTLY CLAIMED INVENTION

Techniques for data pattern analysis using deterministic finite automaton are described herein. In one embodiment, a number of transitions from a current node to one or more subsequent nodes representing one or more sequences of data patterns is determined, where each of the current node and subsequent nodes is associated with a deterministic finite automaton (DFA) state. A data structure is dynamically allocated for each of the subsequent nodes for storing information associated with each of the subsequent nodes, where data structures for the subsequent nodes are allocated in an array maintained by a data structure corresponding to the current node if the number of transitions is greater than a predetermined threshold.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIGS. 6A-6B are pseudo code representing examples of data structures according to certain embodiments of the invention.

DETAILED DESCRIPTION

Figure 1:
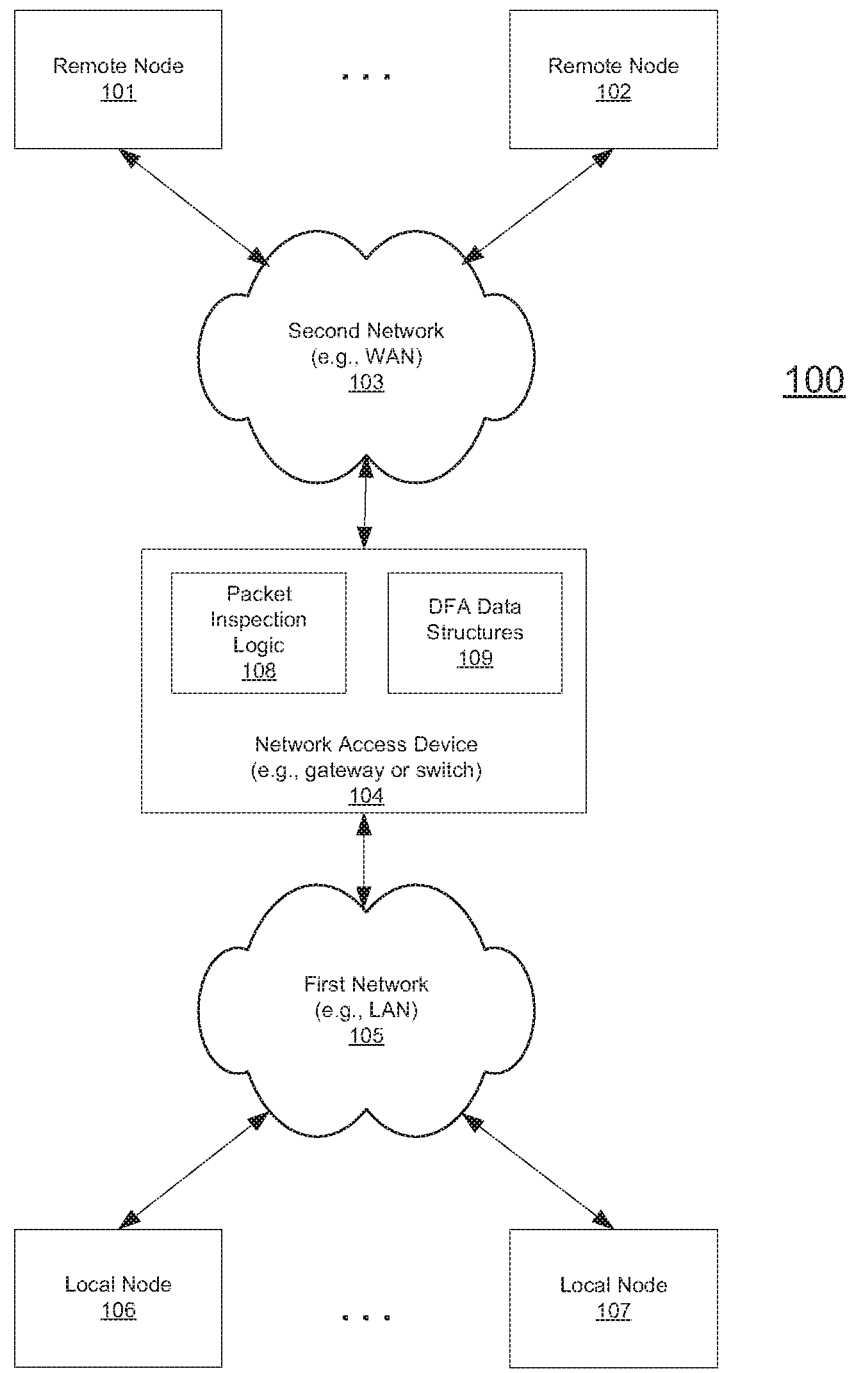
FIG. 1 is a block diagram illustrating an example of a network configuration according to one embodiment.

Techniques for data pattern analysis using deterministic finite automaton are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Recently, DFA states have been widely used in identifying certain data patterns of data traffics such as, for example, antivirus, anti-spyware and/or content filtering processes in a network environment. Each DFA state is associated with a data structure to store certain information regarding to a respective DFA state such as target or matched data, link references to other data structures of other DFA states. The data structures of DFA states that represent certain data pattern may be referenced one another. A first data structure may reference a second data structure either including the whole second data structure (e.g., an array) or alternatively, a link referenced to an address of the second data structure (e.g., a linked-list structure). As described above, if the first data structure contains the entire second data structure, processing logic can access from the first data structure to the second data structure faster, but it requires more memory to retain the second data structure. In a linked-list manner, it takes less memory; however, it accesses slower.

According to certain embodiments of the invention, dependent upon certain data patterns being examined, data structures for the DFA states may be allocated in an array manner, a linked-list manner, or a combination of both, to optimize the memory usage (e.g., a hybrid approach). For example, given the fact that some states do not necessarily have all 256 transitions (e.g., standard 256 ACSII codes representing 256 characters) associated with them and some do, for certain states with more than or equal to a certain threshold, most or all transitions are allocated as pointers in a dynamic array. For states which have transitions fewer than certain threshold, the transitions may be allocated in a linked-list manner in which each state requires only two pointers, one referencing to its parent and the other one referencing to its child. Alternatively, for a given state of a sequence of state representing a data sequence, based on a relationship between the given state and its top parent state (e.g., root state), a data structure for the given state may be allocated in a data array or in a linked-list manner. For example, if a given node is within a predetermined distance from its root node, the data structure corresponding to the given node may be allocated in an array; otherwise, the data structure may be allocated in a linked-list manner. The distance threshold may be user configurable and/or specified in the data structure of the root node. Other configurations may exist.

FIG. 1 is a block diagram illustrating an example of a network configuration according to one embodiment. Referring to FIG. 1, in one embodiment, the network configuration 100 includes a network access device 104 providing network access services for one or more network nodes 106-107 over a first network 105 which may be a local area network (LAN). In order to access remote nodes 101-102 (e.g., Web servers or peer nodes) over a second network 103 (e.g., an external network), each of the nodes 106-107 has to go through the network access device 104 and optionally, a network service provider (e.g., an Internet service provider or ISP) in order to access remote nodes 101-102.

In one embodiment, the connection between the network access device 104 and the network 103 may be a wired connection. Alternatively, such a connection may be a wireless connection; for example, a satellite or an IEEE 802.1x compatible connection. The network 103 may be a wide area network (WAN), such as, for example, the Internet. The network 105 may be a home network using an IEEE 802.1x compatible protocol. Alternatively, the network 105 may be a local network within an organization (e.g., an Intranet). The network 105 may be a wired or wireless network, or a combination of both, using a variety of network protocols, such as, Ethernet and/or IEEE 802.1x compatible protocols, such as, for example, Wi-Fi and/or Bluetooth protocols. Wireless connections may include both RF and non-RF links, for example, an IR link. Wired connections may include both electrical and non-electrical links, for example, fiber optic links.

According to one embodiment, network access device 104 (e.g., gateway device) includes packet inspection logic 108 which may be implemented as part of an antivirus/spyware and/or content filtering function of the network access device 104. Packet inspection logic 108 may inspect incoming and/or outgoing data packets to detect certain data patterns which may be used to identify certain offensive data such as viruses or certain offensive content. The packet inspection logic 108 may use multiple DFA states to identify the data patterns, where each DFA is associated with a data structure (e.g., DFA data structures 109) to store certain state information of the respective DFA state. According to one embodiment, the DFA data structures 109 may be allocated dependent upon the specific transitions from one DFA state to another DFA state of a data pattern. The data structures of the child nodes may be allocated in a dynamic array fashion, a linked-list manner, or a combination of both. For example, for certain states with more than or equal to a certain threshold, most or all transitions are allocated as pointers in a dynamic array. For states which have transitions fewer than certain threshold, the transitions may be allocated in a linked-list manner in which each state requires only two pointers, one referencing to its parent and the other one referencing to its child. Furthermore, a data structure for a given node may be allocated in an array or in a linked-list manner dependent upon its relationship (e.g., distance from the root node) with respect to its top parent node or root node. As a result, memory usage for the DFA data structures may be optimized without compromising the performance of content scanning.

Figure 2A:
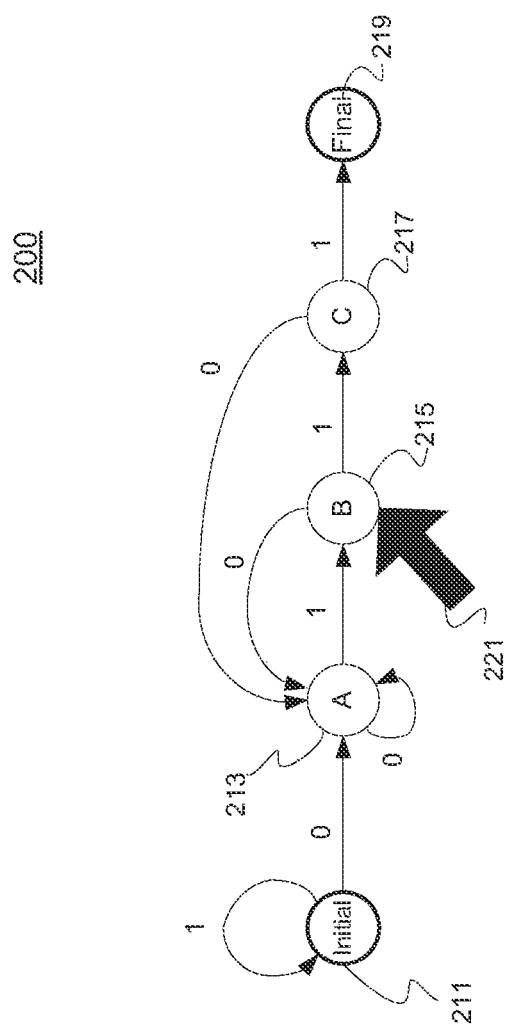
FIGS. 2A-2B are state diagrams illustrating an exemplary DFA according to certain embodiments of the invention.

FIG. 2A is a state diagram illustrating an exemplary DFA according to one embodiment of the invention. In this example, an IPS (intrusion detection/prevention system) is programmed to detect and to prevent a pattern of "0111" to pass through. The DFA 200 shown in FIG. 2A corresponds to this pattern. Processing logic may use the DFA 200 to perform pattern matching on a number of packets to determine whether the packets contain the pattern "0111". Furthermore, to simplify the illustration, it is assumed in this example that each packet contains only one digit. However, it should be appreciated that the concept is applicable to scenarios where a packet contains more than one digit and/or alphabetic letters.

Referring to FIG. 2A, the DFA 200 includes 5 states 211-219. The states 211-219 in the DFA 200 may be referred to as nodes. Pattern matching begins at the initial state 211. If a packet received contains a "1", processing logic remains in the initial state 211. If the packet contains a "0", which corresponds to the first digit in the predetermined pattern, processing logic transitions to the A state 213. If processing logic receives a "0" subsequently, processing logic remains in the A state 213. If processing logic receives a "1", which corresponds to the second digit in the predetermined pattern, then processing logic transitions into the B state 215. From the B state 215, processing logic may transition back to the A state 213 if the next packet received contains a "0". If the next packet received contains a "1", which corresponds to the third digit in the predetermined pattern, then processing logic transitions to the C state 217.

From the C state 217, processing logic may transition back to the A state 213 if the next packet received contains a "0". If the next packet received contains a "1", which corresponds to the last digit in the predetermined pattern, then processing logic transitions to the final state 219. When processing logic reaches the final state 219, processing logic knows that the packets received so far contains the predetermined pattern. Hence, processing logic may perform the appropriate operations in response to receiving the predetermined pattern, such as block the packet of the predetermined pattern last received and issuing an alarm to alert system administrators. To keep track of which state of the DFA processing logic is in, processing logic may use a logical pointer to point to the current state of the DFA. For example, a logical pointer 221 in FIG. 2A points at state B 215 to indicate that state B 215 is the current state of the pattern matching.

One advantage of using the DFA to perform pattern matching on packets is to eliminate the need to reassemble the packets because processing logic can walk through the DFA as each packet is received and examined. If processing logic reaches a final state, there is a match between the pattern contained in the packets received so far and the predetermined pattern. As mentioned above, a pattern is typically broken up into a number of segments and each segment is transmitted using a packet. Using the DFA, processing logic may not have to reassemble the packets in order to find out what the pattern contained in the packets is in order to match the pattern against a predetermined pattern. Processing logic may perform pattern matching on a packet-by-packet basis as each of the packets is received without reassembling the packets. Therefore, processing logic does not have to store the packets for reassembling the packets. Instead, processing logic may simply store a pointer to keep track of the current state in the DFA.

The concept described above may be expanded to signature detection. A signature is a collection of multiple patterns. To keep track of which pattern within a signature is being matched, processing logic may use a tree structure, where each node within the tree structure corresponds to a pattern and each pattern is represented using a DFA. Alternatively, a single DFA may represent multiple patterns, an example of which is discussed below with reference to FIG. 2B. Processing logic may use a pointer to point at the node corresponding to the pattern that is currently being matched.

In some embodiments, multiple patterns in a signature are matched sequentially. That is, once a first pattern is matched, processing logic goes on to try to match a second pattern. However, processing logic may continue looking for the first pattern in the incoming data packets because the first pattern may repeat before the second pattern arrives. In some embodiments, processing logic has to take into consideration of additional rules besides matching individual patterns of a signature. For example, a first pattern may have to be at least x bytes away from the second pattern, where x is a predetermined number. Alternatively, two patterns of the signature may have to be separated from each other by y bytes or less, where y is a predetermined number.

Figure 2B:
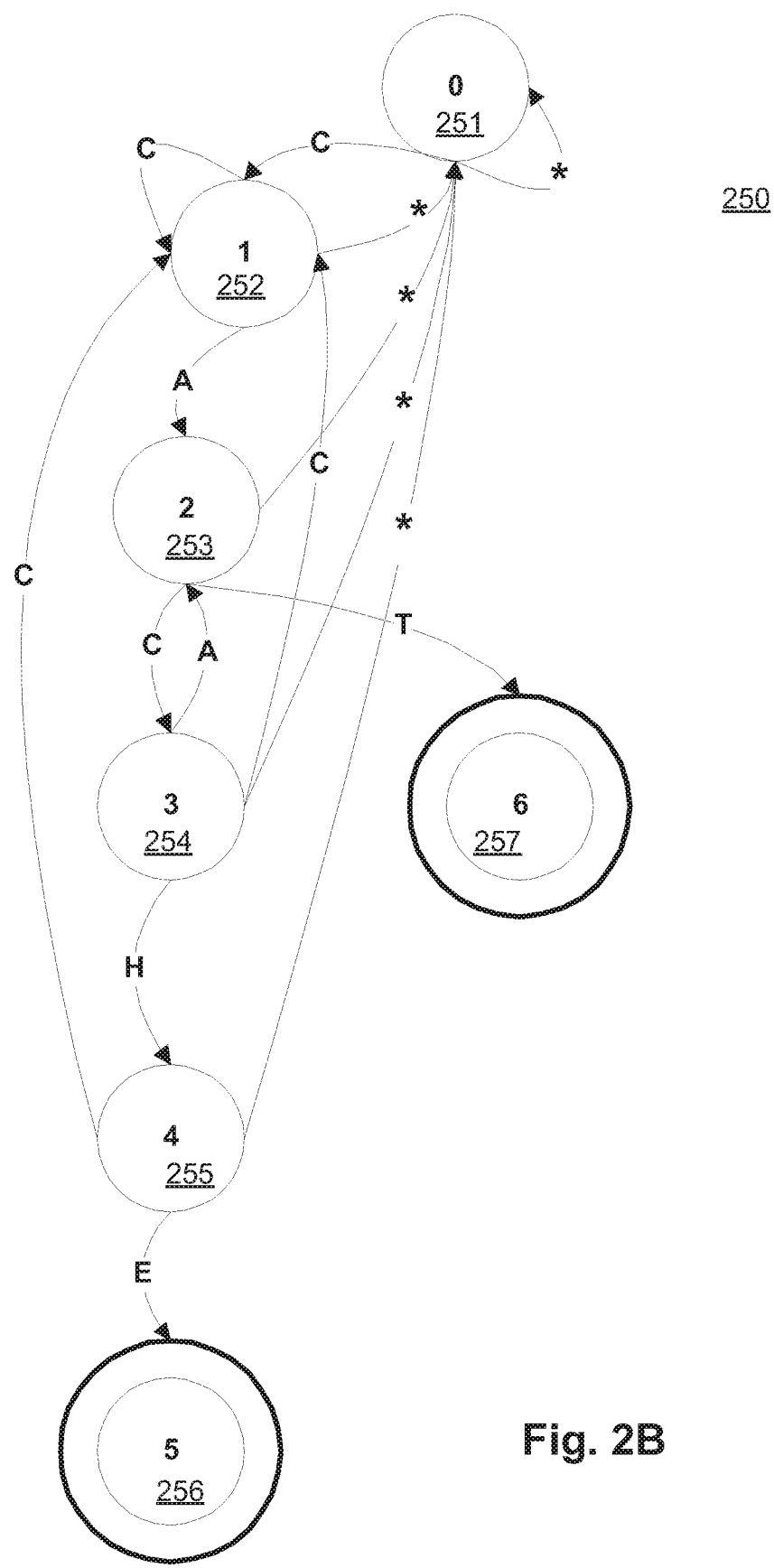

FIG. 2B is a state diagram illustrating an exemplary DFA according to an alternative embodiment of the invention. In this example, an IPS is programmed to detect a pattern of "CAT" and a pattern of "CACHE." Both patterns may be part of a signature. To simplify the illustration, it is assumed in this example that each packet contains only one alphabetic letter. However, it should be appreciated that the concept is applicable to scenarios where a packet contains one or more alphabetic letters and/or one or more numeric digits.

The DFA 250 includes six states 251-257. Pattern matching begins at the initial state 251. If a packet received contains a "C," which is the first letter of both "CAT" and "CACHE," processing logic transitions to the state 252. If the packet received contains any other alphabet, processing logic remains in the initial state 251. From state 252, if processing logic receives a "C," then processing logic remains in state 252. If processing logic receives an "A," then processing logic transitions to state 253. If processing logic receives any alphabet other than "A" or "C," processing logic returns to the initial state 251.

From state 253, if processing logic receives a "C," then processing logic transitions to state 254 because "C" is the third letter in the pattern "CACHE." If processing logic receives a "T," then processing logic transitions to the final state 257 because the pattern "CAT" is matched. If processing logic receives any alphabet other than "T" or "C," processing logic returns to the initial state 251. From state 254, if processing logic receives a "C," then processing logic transitions back to state 253. If processing logic receives an "H," then processing logic transitions to state 255. If processing logic receives any alphabet other than "H" or "C," processing logic returns to the initial state 251.

From state 255, if processing logic receives a "C," then processing logic transitions back to state 252. If processing logic receives an "E," then processing logic transitions to the final state 256 because the pattern matches "CACHE." If processing logic receives any alphabet other than "E" or "C," processing logic returns to the initial state 251. As discussed above, when processing logic reaches a final state (e.g., state 256 and state 257), processing logic knows that the packets received so far contains at least one of the predetermined patterns. Hence, processing logic may perform the appropriate operations in response to receiving the predetermined pattern, such as blocking the packet of the predetermined pattern last received and issuing an alarm to alert system administrators. Furthermore, to keep track of which state of the DFA 250 processing logic is in, processing logic may use a logical pointer to point to the current state of the DFA 250. Further detailed information concerning the above packet scanning techniques can be found in a co-pending U.S. patent application Ser. No. 11/112,252, entitled "Method and Apparatus for Identifying Data Patterns in a File," filed Apr. 21, 2005, which has been assigned to a common assignee of this application, and which is incorporated by reference herein in its entirety.

As described above, each DFA state is associated with a data structure for storing state information for the respective DFA state. Each data structure is dynamically allocated from a parent state dependent upon a specific data pattern at the point in time. For example, referring to FIG. 2B, at node or state 253, a next state could be state 254 or state 257 dependent upon a specific data pattern. As a result, a DFA data structure associated with a child node of node 253 may be in a dynamic array manner or in a linked list manner based on certain rules, which may be configured by a network administrator or predetermined policies.

Figure 3:
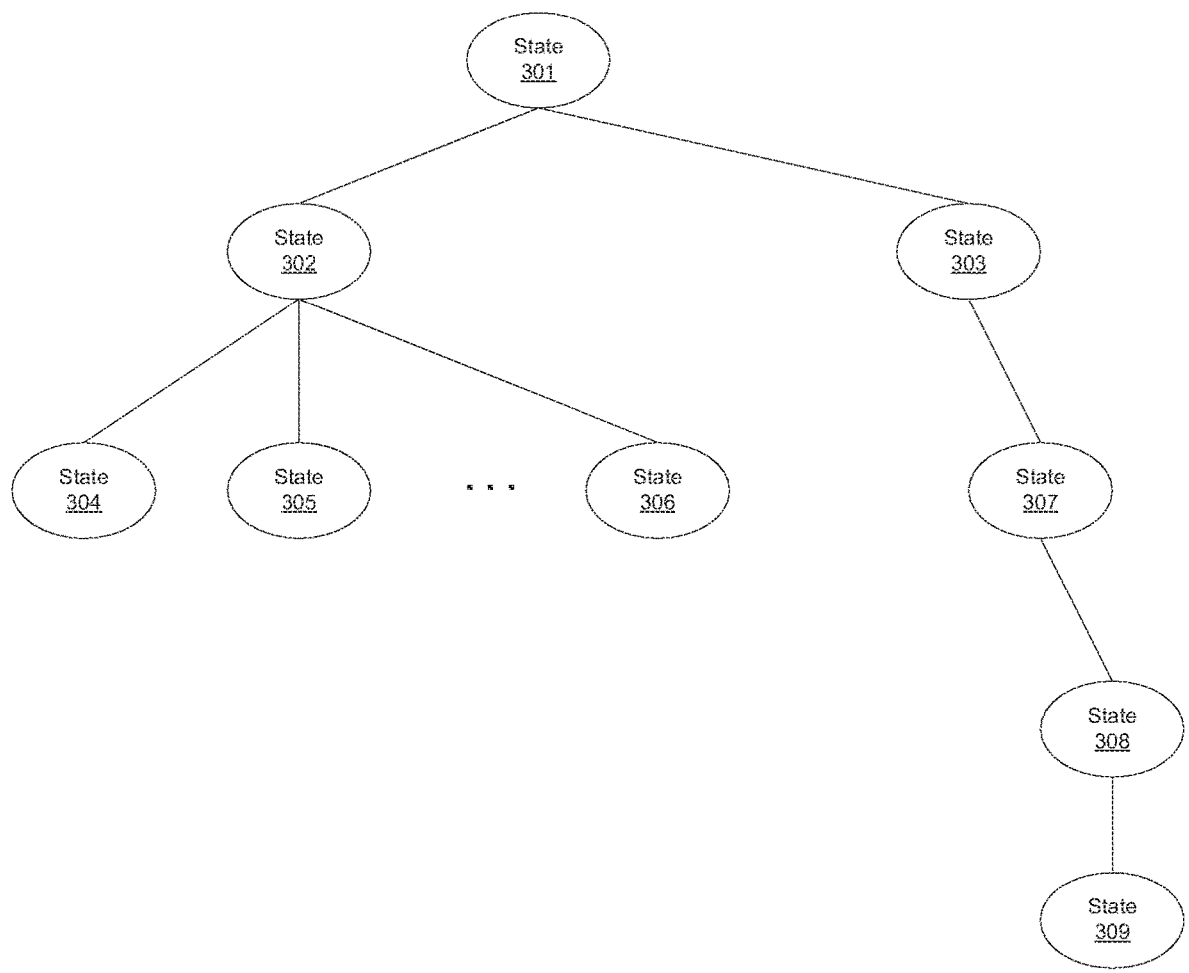
FIG. 3 is a state diagram illustrating an example of DFA states which may represent a data pattern.

FIG. 3 is a state diagram illustrating an example of DFA states which may represent a data pattern. Referring to FIG. 3, in this example, a parent node 301 has two child nodes 302-303, each corresponding to a transition from node 301. Node 302 includes child nodes 304-306, each corresponding to a transition from node 302, while node 302 itself is a child node to node 301. Node 303 includes only one child node 307 forming a single node chain having nodes 308 and 309.

According to one embodiment, for a given node, if a number of transitions from this given node to child nodes of this given node is greater than or equal to a predetermined threshold, the data structures for the child nodes are allocated in an array do that the data structures of the child nodes can be directly accessed from the data structure of the given node (e.g., parent node). In this configuration, if number of the transitions is relatively large, that means the child nodes or DFA states are frequently accessed from the parent node (e.g., commonly used data patterns). As a result, it is desirable that the data structures for all child nodes are maintained and directly accessed from the parent node for the purposes of performance, even though this configuration requires more memory (e.g., contiguous or continuous) for the data structures.

Figure 4A:
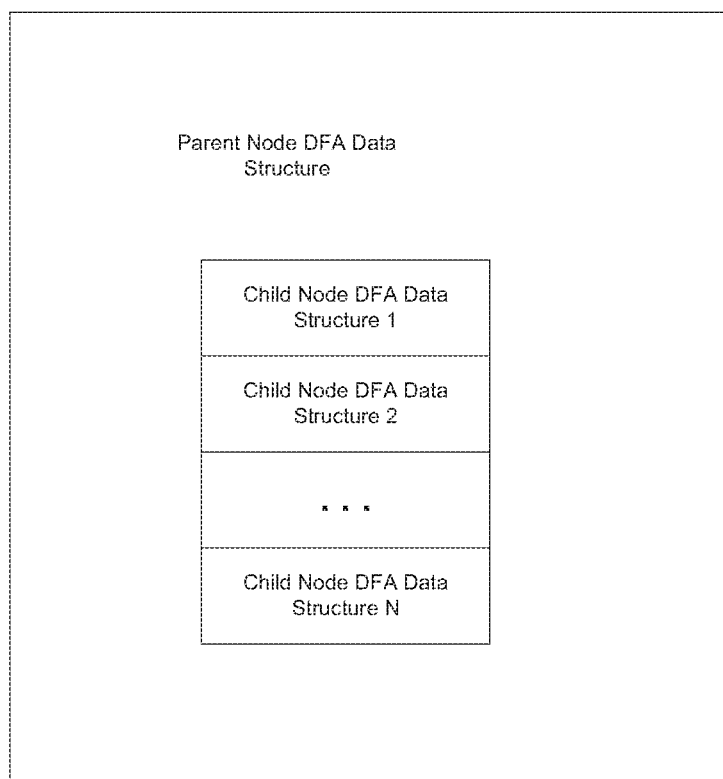
FIGS. 4A-4B are block diagrams illustrating examples of data structure configurations according to certain embodiments of the invention.
Figure 4B:
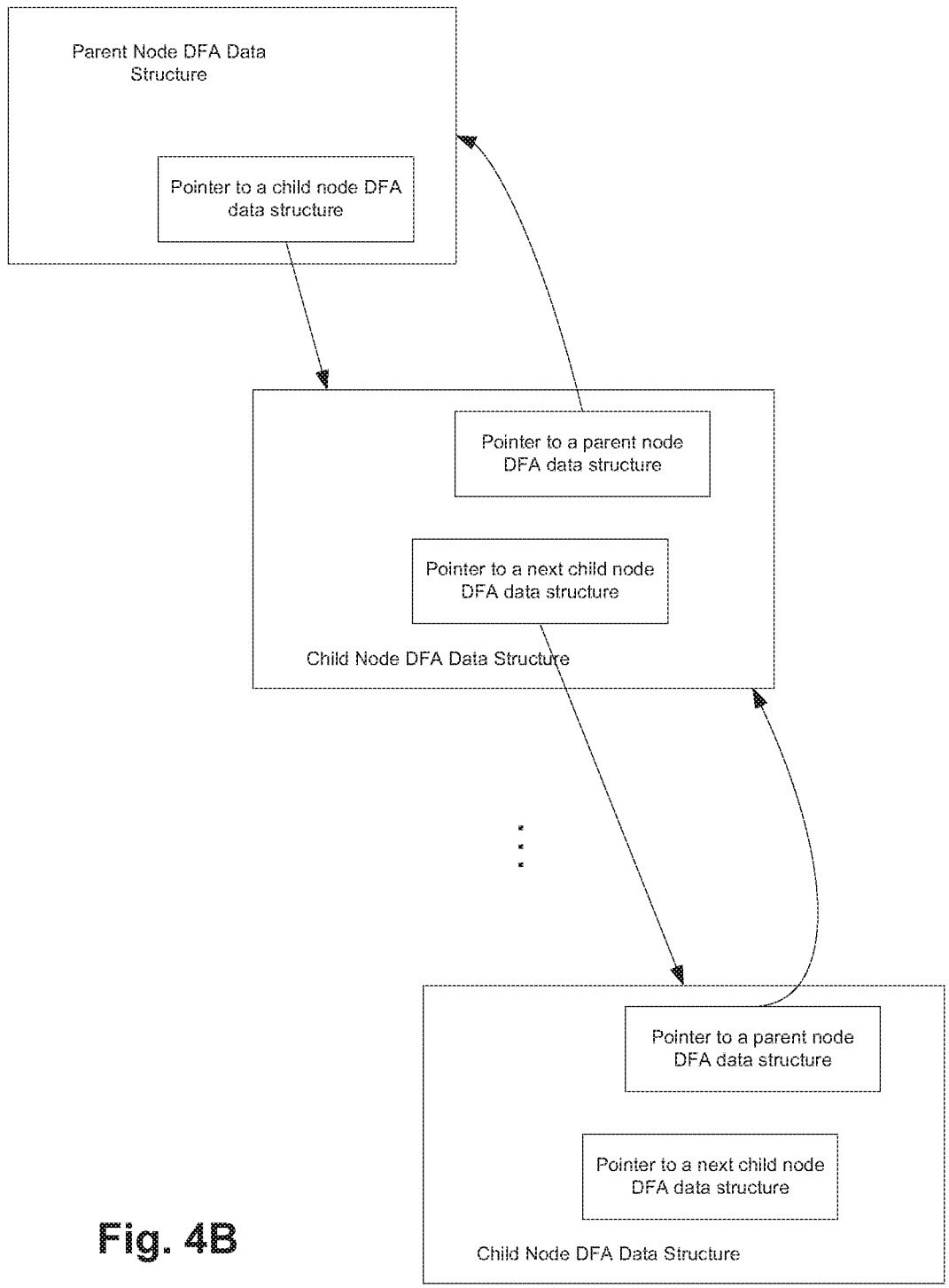

Referring back to FIG. 3, given node 302, it is assumed that the number of transitions from node 302 to nodes 304-306 is greater than or equal to a predetermined threshold (e.g., 3 in this example). Thus, from the data structure associated with node 302, data structures for nodes 304-306 are allocated in an array (e.g., a continued block of memory)

which can be directly and quickly accessed from node 302, as shown in FIG. 4A. In this situation, the benefit of higher performance outweighs the detriment of requiring a larger memory block. If, however, the number of transitions is less than a certain threshold, the data structures of the child nodes may be allocated in a linked-list configuration as shown in FIG. 4B, where each data structure includes a first reference pointer linked with a data structure of its immediate parent node and a second reference pointer linked with a data structure of one its immediate child node in a chain fashion. In a linked-list configuration a parent node has to walk through one child node at a time in order to access to all of its child nodes. In this way, a smaller continued or contiguous block of memory is needed; however, it may take a longer time to access all the child nodes. Since there are fewer child nodes, memory usage may be reduced and the performance drawback may be minimized.

According to another embodiment, for a given node, if there is only one immediate child node (e.g., the whole data sequence is a single child chain where a node has only zero or one child node), a data structure of the top parent node of the chain may include most or all necessary information for the child nodes in the chain, optionally in a compressed manner, to further reduce memory usage without significantly compromising the performance. In this example as shown in FIG. 3, data structures for states or nodes 303, and 307-309 may be allocated in a compressed form within the data structure corresponding their root parent node 301. Examples of pseudo code in C/C++ representing the data structures are shown in FIGS. 6A-6B.

Furthermore, according to further embodiment, for a given state of a sequence of state representing a data sequence, based on a relationship between the given state and its top parent state (e.g., root state), a data structure for the given state may be allocated in a data array or in a linked-list manner. For example, if a given node is within a predetermined distance from its root node, the data structure corresponding to the given node may be allocated in an array; otherwise, the data structure may be allocated in a linked-list manner. The distance threshold may be user configurable and/or specified in the data structure of the root node.

Referring back to FIG. 3, for example, it is assumed that a data structure for any node within a three node distance from its root parent node will be allocated in an array; otherwise the data structure will be allocated in a linked-list manner. Thus, in this example as shown in FIG. 3, data structures for nodes 303 and 307-308 may be allocated in an array within the data structure for the root node 301, while the data structure for node 309 may be allocated in a separate data structure accessible from the data structure corresponding to node 308 via a linked-list manner. Note that the configurations of data structures described above may be allocated in a mixed or combined manner. Thus, data structures for a particular sequence may be allocated in an array in part and in a linked-list manner in part.

Figure 5A:
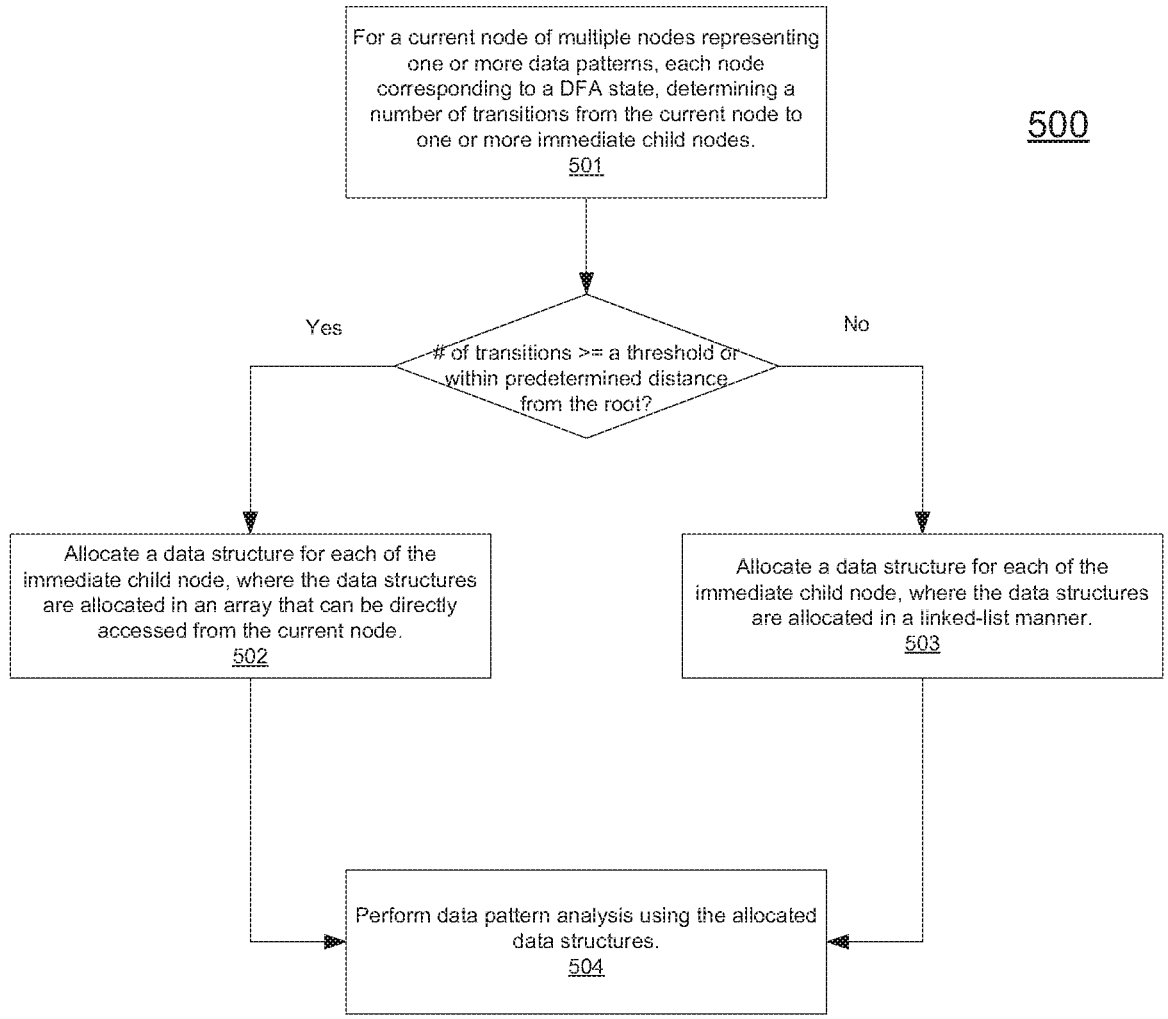
FIGS. 5A-5B are flow diagrams illustrating a process for data pattern analysis according to certain embodiments of the invention.

FIG. 5A is a flow diagram illustrating a process for data pattern analysis according to one embodiment of the invention. Note that process 500 may be performed by processing logic which may include hardware, software, or a combination of both. For example, process 500 may be performed by a network access device such as network access device 104 of FIG. 1. Referring to FIG. 5A, at block 501, for given a current node of multiple nodes representing one or more data patterns, where each node corresponding to a DFA state, processing logic determines a number of transitions from the current node to one or more immediate child nodes. If the number of transitions is greater than or equal to a predetermined threshold or alternatively, if a child node is within a predetermined distance from the root node, at block 502, data structures for the child nodes are allocated in an array (e.g., continuous block of memory) that are directly accessible from the current node. In this way, the data structures of the child nodes can be quickly accessed, but it requires more memory at block 504. Otherwise, at block 503, each data structure corresponding to an immediate child node is allocated in a linked-list manner, where the current node has to "walk" through intermediate nodes in order to reach a node down at the bottom of the linked-list. In this way, it requires less memory, but the performance (e.g., speed) to access these data structures would be reduced at block 504. Other operations may also be performed.

Figure 5B:
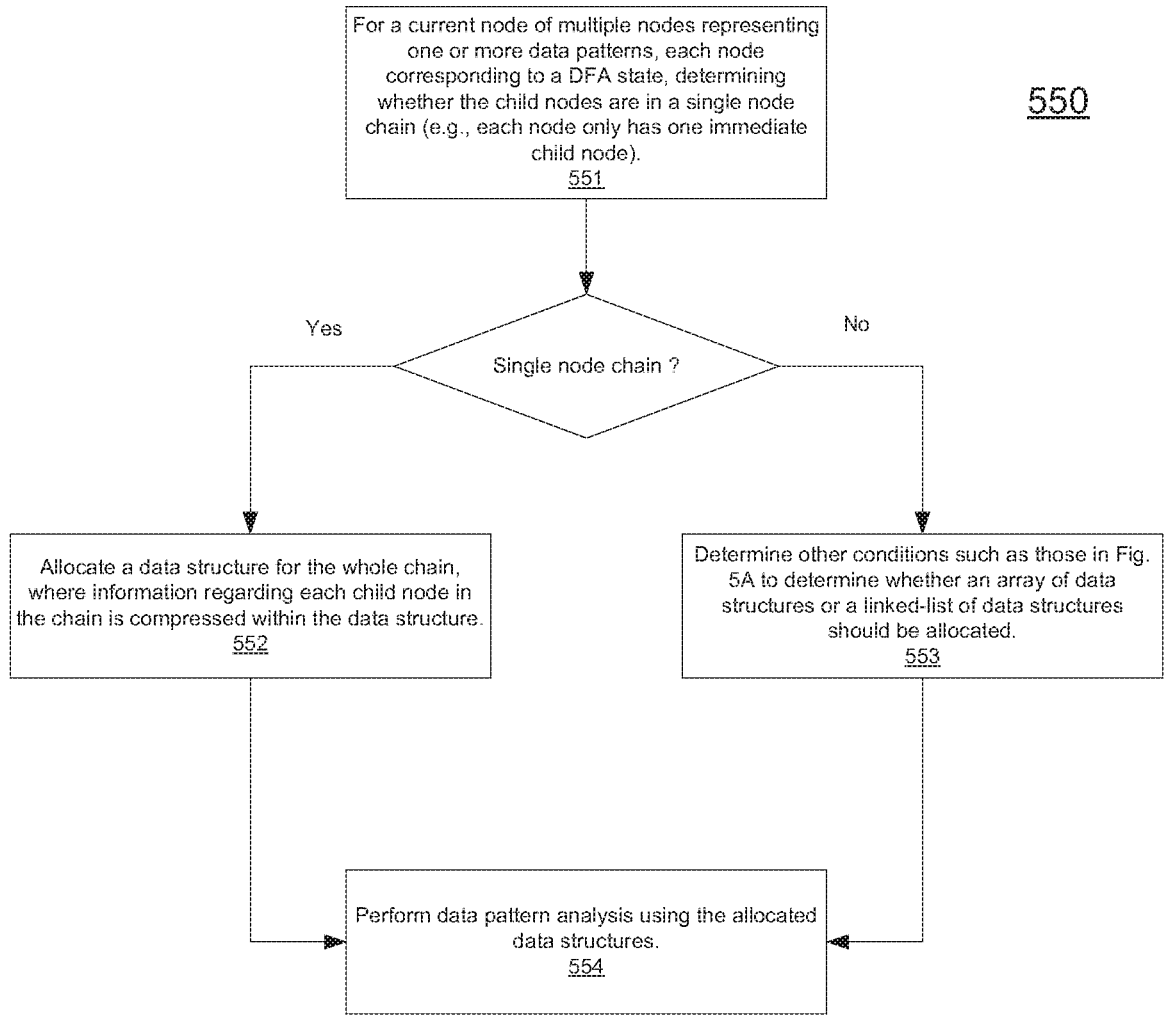

FIG. 5B is a flow diagram illustrating a process for data pattern analysis according to an alternative embodiment of the invention. Note that process 550 may be performed by processing logic which may include hardware, software, or a combination of both. For example, process 550 may be performed by a network access device such as network access device 104 of FIG. 1. Referring to FIG. 5B, at block 551, for given a current node of multiple nodes representing one or more data patterns, where each node corresponding to a DFA state, processing logic determines whether the child nodes are in a single node chain (e.g., each node in the chain only has one immediate child node). If so, at block 552, a single data structure is allocated for the entire chain. In one embodiment, the single data structure is allocated for the most top parent node of the chain. The data members of the single data structure are used to store all necessary information for each child node in the chain, optionally in a compressed form, which can be directly accessed during data pattern analysis at block 554. Otherwise, at block 553, the data structures for the child nodes may be allocated dependent upon other factors such as those shown in FIG. 5A. Other operations may also be performed.

FIG. 6A is pseudo code representing a data structure used in a data pattern analysis according to one embodiment. Referring to FIG. 6A, data structure 600 may be allocated to a parent node of a sequence of data pattern. As described above, data structure 600 representing a parent node may need to access a data structure of a child node in a form dependent upon a specific configuration of a data pattern. For example, as described above, if the number of transitions from a parent node exceeds a predetermined threshold, the data structures of all child nodes are allocated in an array as data member 601 directly accessed by data structure 600. In this situation, the benefit of higher performance justifies a larger memory block.

Otherwise, if the number of transitions from a parent node is below a predetermined threshold, the data structures of all child nodes are allocated in a linked-list manner as data member 602 in which a parent node associated with data structure 600 has to "walk" through each data structure one at a time. Although it may take longer time to walk through, a smaller memory block is needed. Since the number of transitions is relatively small, the balance of memory usage and performance is achieved.

In a special situation in which the sequence of data pattern is a single node chain, as described above, a single data structure is allocated for all child nodes in a compressed form as data member 603 (with a data structure example as shown in FIG. 6B). That is, in this situation, only one data structure accessed from the parent node is needed to represent all child nodes. Since each child node can only have up to two transitions, either to an immediate parent node or to an immediate child node, a single data structure is sufficient to cover all necessary information associated with each child node in the chain.

In addition, according to certain embodiments, data structure 600 includes data member 604 to store an entry point to a data structure of a right sibling (e.g., a horizontal sibling as shown in FIG. 3). Data member 605 is used to store an entry point to each transition state (also referred to as a fail state) when a current state fails to match a target data. Data member 606 is used to store an entry point of a function or routine to which processing logic will call when the current state matches the target data. Data member 606 may contain additional information about what exactly was matched by the entire sequence, such as, for example, a pattern ID and/or a function pointer to call when the match occurs, etc. Data member 607 is used to store the number of child nodes with respect to the current node as a parent node. For example, child count 607 may be used to determine whether certain child nodes should be allocated in an array or in a linked-list manner. Alternatively, the distance of a particular child node with respect to its root node can be used to determine whether the data structure for the node should be allocated in an array or in a linked-list manner. Data member 608 is used to store an ASCII content of the current node.

Further, data member 609 is used to indicate whether the data structures of the child nodes are allocated in an array. If so, data member 601 is valid; otherwise, data member 602 is valid. Data member 610 is used to indicate whether the childe nodes are in a single node chain; if so, data member 603 will take a precedent. Data structure 600 may further include certain attributes associated with the current node and/or the sequence of data pattern. For example, data member 611 may be used to indicate whether a particular character should be treated as a case sensitive or insensitive manner. Data member 612 may be used to indicate that a fail pointer from the current character points to a node with a match state, in which case, processing logic needs to follow a fail pointer and temporarily match something else while the processing logic is walking through the sequence. Note that the format of data structure 600 is shown for purposes of illustration only. More or fewer data members, as well as other formats, may also be implemented.

FIG. 6B is pseudo code representing a data structure used in a data pattern analysis according to one embodiment. For example, data structure 650 may be used in a single node data chain (e.g., accessed from data structure 600 of FIG. 6A via data member 603). Data structure 650 may be allocated as a single data structure to cover all child nodes in the chain, optionally in a compressed form. According to one embodiment, data member 651 may be used to indicate how many child nodes in the chain. Similar to data member 606 of data structure 600, data member 652 may include additional information about what exactly was matched by the entire sequence, such as, for example, a pattern ID and/or a function pointer to call when the match occurs, etc. Data member 653 may be used to represent the ASCII content of the chain, such as, for example, data sequence of "ABCDEFGH", etc. Data member 654 may be used to represent certain attributes associated with each character in the chain, such as those similar to attributes stored in data members 611-612 of data structure 600. For example, key[0] may be used to store attributes associated with character 'A' of data member 653. Similar to data member 612 of data structure 600, data member 655 may be used to store each of the fail states. Also note that the format of data structure 650 is shown for purposes of illustration only. More or fewer data members, as well as other formats, may also be utilized.

Figure 7:
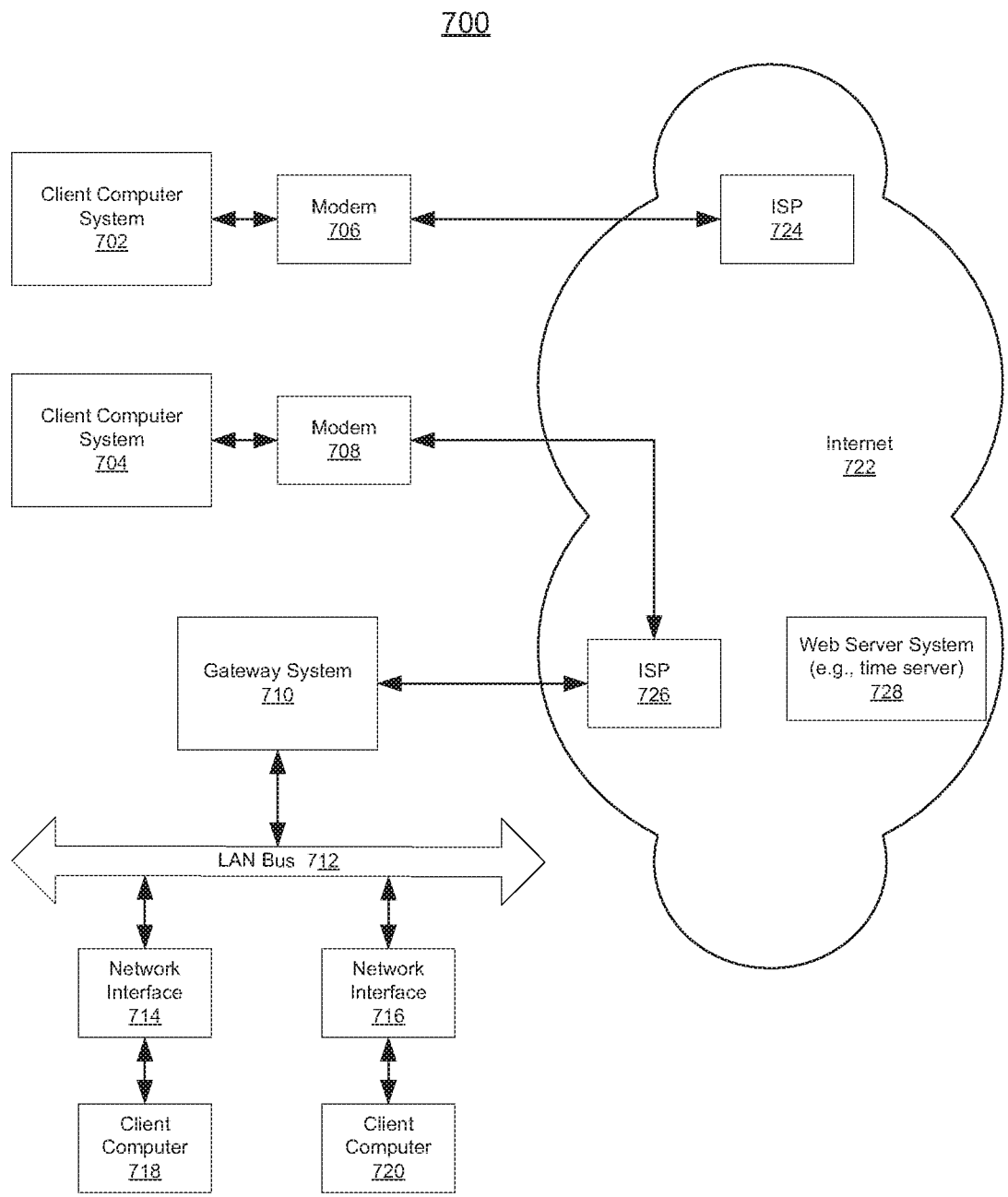
FIG. 7 is a diagram of a network of computer systems, which may be used with an embodiment of the invention.

FIG. 7 is a diagram of a network of computer systems, which may be used with an embodiment of the invention. As shown in FIG. 7, a network 700 includes a number of client computer systems that are coupled together through an Internet 722. It will be appreciated that the term "Internet" refers to a network of networks. Such networks may use a variety of protocols for exchange of information, such as TCP/IP, ATM, SNA, SDI. The physical connections of the Internet and the protocols and communication procedures of the Internet are well known to those in the art. It will be also appreciated that such systems may be implemented in an Intranet within an organization.

Access to the Internet 722 is typically provided by Internet service providers (ISPs), such as the ISP 724, and the ISP 726. Users on client systems, such as the client computer systems 702, 704, 718, and 720, generally obtain access to the Internet through Internet service providers, such as ISPs 724 and 726. Access to the Internet may facilitate transfer of information (e.g., email, text files, media files, etc.) between two or more digital processing systems, such as the client computer systems 702, 704, 718, and 720 and/or a Web server system 728.

For example, one or more of the client computer systems 702, 704, 718, and 720 and/or the Web server 728 may provide document presentations (e.g., a Web page) to another one or more of the client computer systems 702, 704, 718, and 720 and/or Web server 728. For example, in one embodiment of the invention, one or more client computer systems 702, 704, 718, and 720 may request to access a document that may be stored at a remote location, such as the Web server 728. In the case of remote storage, the data may be transferred as a file (e.g., download) and then displayed (e.g., in a window of a browser) after transferring the file. In another embodiment, the document presentation may be stored locally at the client computer systems 702, 704, 718, and/or 720. In the case of local storage, the client system may retrieve and display the document via an application, such as a word processing application, without requiring a network connection.

The Web server 728 typically includes at least one computer system to operate with one or more data communication protocols, such as the protocols of the World Wide Web and, as such, is typically coupled to the Internet 722. Optionally, the Web server 728 may be part of an ISP which may provide access to the Internet and/or other network(s) for client computer systems. The client computer systems 702, 704, 718, and 720 may each, with appropriate Web browsing software, access data, such as HTML document (e.g., Web pages), which may be provided by the Web server 728.

The ISP 724 provides Internet connectivity to the client computer system 702 via a modem interface 706, which may be considered as part of the client computer system 702. The client computer systems 702, 704, 718, and 720 may be a conventional data processing system, such as a desktop computer, a "network" computer, a handheld/portable computer, a cell phone with data processing capabilities, a Web TV system, or other types of digital processing systems (e.g., a personal digital assistant (PDA)).

Similarly, the ISP 726 provides Internet connectivity for the client computer systems 702, 704, 718, and 720. However, as depicted in FIG. 7, such connectivity may vary between various client computer systems, such as the client computer systems 702, 704, 718, and 720. For example, as shown in FIG. 7, the client computer system 704 is coupled to the ISP 726 through a modem interface 708, while the client computer systems 718 and 720 are part of a local area network (LAN). The interfaces 706 and 708, shown as modems 706 and 708, respectively, may represent an analog modem, an ISDN modem, a DSL modem, a cable modem, a wireless interface, or other interface for coupling a digital processing system, such as a client computer system, to another digital processing system.

The client computer systems 718 and 720 are coupled to a LAN bus 712 through network interfaces 714 and 716, respectively. The network interface 714 and 716 may be an Ethernet-type, asynchronous transfer mode (ATM), or other type of network interface. The LAN bus is also coupled to a gateway digital processing system 710, which may provide firewall and other Internet-related services for a LAN. The gateway digital processing system 710, in turn, is coupled to the ISP 726 to provide Internet connectivity to the client computer systems 718 and 720. The gateway digital processing system 710 may, for example, include a conventional server computer system. Similarly, the Web server 728 may, for example, include a conventional server computer system.

In one embodiment, the local area network 712 may be local wireless network (e.g., a home network) and the gateway 710 may include a wireless access point (also referred to as a base station) to one or more clients 718 and 720 using a variety of wireless networking protocols; for example, the IEEE 802.xx protocols including Wi-Fi and/or Bluetooth protocols. In a further embodiment, the gateway 710 may access the server 728 via dialup network services using a modem.

Figure 8:
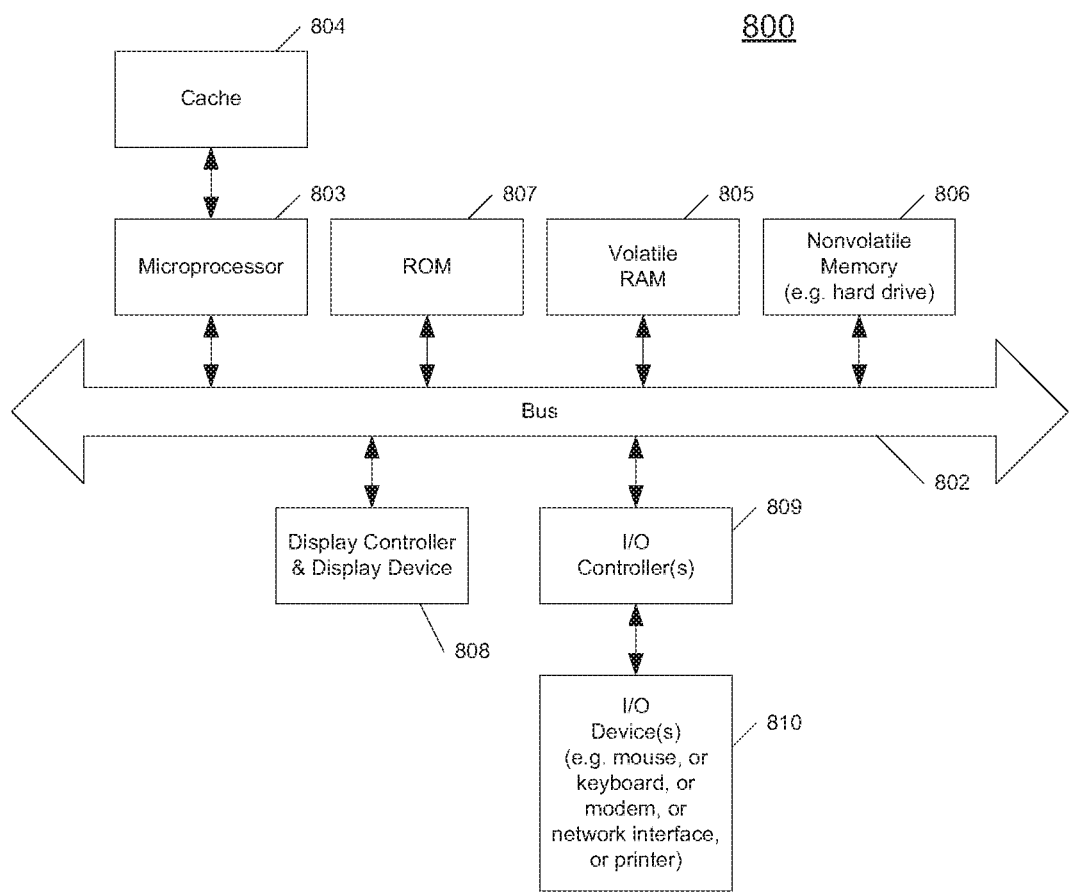
FIG. 8 is a block diagram of a digital processing system which may be used with one embodiment of the invention.

FIG. 8 is a block diagram of a digital processing system which may be used with one embodiment of the invention. For example, the system 500 shown in FIG. 8 may be used as a client computer system such as clients 704-705 of FIG. 7. Alternatively, the exemplary system 800 may be implemented as a network access device 702, etc.

Note, that while FIG. 8 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention. The computer system of FIG. 8 may, for example, be an Apple Macintosh computer or an IBM compatible PC.

As shown in FIG. 8, the computer system 800, which is a form of a data processing system, includes a bus 802 which is coupled to a microprocessor 803 and a ROM 807, a volatile RAM 805, and a non-volatile memory 806. The microprocessor 803, which may be, for example, an Intel processor or a PowerPC processor, is coupled to cache memory 804 as shown in the example of FIG. 8. The bus 802 interconnects these various components together and also interconnects these components 803, 807, 805, and 806 to a display controller and display device 808, as well as to input/output (I/O) devices 810, which may be mice, keyboards, modems, network interfaces, printers, and other devices which are well-known in the art.

Typically, the input/output devices 810 are coupled to the system through input/output controllers 809. The volatile RAM 805 is typically implemented as dynamic RAM (DRAM) which requires power continuously in order to refresh or maintain the data in the memory. The non-volatile memory 806 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 8 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 802 may include one or more buses connected to each other through various bridges, controllers, and/or adapters, as is well-known in the art. In one embodiment, the I/O controller 809 includes a USB (Universal Serial Bus) adapter for controlling USB peripherals. Alternatively, I/O controller 809 may include an IEEE-1394 adapter, also known as FireWire adapter, for controlling FireWire devices. Other components may also be included.

Techniques for data pattern analysis using deterministic finite automaton have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An apparatus for data pattern analysis, the apparatus comprising:
   memory that stores information regarding a plurality of data patterns, each data pattern associated with an identified type of content;
   a communication interface that receives a plurality of incoming data packets sent over a network; and
   a processor that executes instructions stored in memory, wherein execution of the instructions by the processor:
      inspects the incoming data packets to identify a number of transitions that are present in a state diagram from one deterministic finite automaton (DFA) state of the state diagram at a current node to another DFA state at each of a plurality of child nodes within the network;
      dynamically allocates a first data structure for storing a plurality of child DFA states at the current node when the number of transitions is less than a predetermined threshold, wherein the plurality of child DFA states is linked in a chain in the first data structure;
      dynamically allocates a second data structure for storing the plurality of child DFA states at the current node when the number of transitions is greater than the predetermined threshold, wherein each of the plurality of child DFA states is directly accessible from the second data structure;
      identifies a match to at least one of the stored data patterns based on analyzing each of the incoming data packets by reference to the dynamically allocated data structure; and
      prevents at least a portion of data included in the data packets from being sent to a computer based on the identified match.

2. The apparatus of claim 1, wherein the predetermined threshold is configurable based on received input.

3. The apparatus of claim 1, wherein each of the child DFA states in the first data structure is directly accessible via a link to an address of the respective child DFA state.

4. The apparatus of claim 1, wherein each of the child DFA states in the first data structure requires only two pointers comprising a pointer to a parent state and a pointer to a further child state.

5. The apparatus of claim 1, wherein the second data structure includes a whole data structure for each of the child DFA states.

6. The apparatus of claim 1, wherein memory further stores at least one routine that is called when a match is identified.

7. The apparatus of claim 1, wherein each of the incoming data packets is analyzed on a packet-by-packet basis.

8. The apparatus of claim 1, wherein none of the incoming data packets are stored nor reassembled.

9. A method for data pattern analysis, the method comprising:
   storing information in memory regarding a plurality of data patterns, each data pattern associated with an identified type of content;
   receiving a plurality of incoming data packets over a network; and
   executing instructions stored in memory, wherein execution of the instructions by a processor:
      inspects the incoming data packets to identify a number of transitions that are present in a state diagram from one deterministic finite automaton (DFA) state of the state diagram at a current node to another DFA state at each of a plurality of child nodes in the network;
      dynamically allocates a first data structure for storing a plurality of child DFA states at the current node when the number of transitions is less than a predetermined threshold, wherein the plurality of child DFA states is linked in a chain in the first data structure;
      dynamically allocates a second data structure for storing the plurality of child DFA states at the current node when the number of transitions is greater than the predetermined threshold, wherein each of the plurality of child DFA states is directly accessible from the second data structure;
      identifies a match to at least one of the stored data patterns based on analyzing each of the incoming data packets by reference to the dynamically allocated data structure; and
      prevent at least a portion of data included in the data packets from being sent to a computer based on the identified match.

10. The method of claim 9, further comprising configuring the predetermined threshold based on received input.

11. The method of claim 9, wherein each of the child DFA states in the first data structure is directly accessible via a link to an address of the respective child DFA state.

12. The method of claim 9, wherein each of the child DFA states in the first data structure requires only two pointers comprising a pointer to a parent state and a pointer to a further child state.

13. The method of claim 9, wherein the second data structure includes a whole data structure for each of the child DFA states.

14. The method of claim 9, further comprising storing at least one routine in memory to be called when a match is identified.

15. The method of claim 9, wherein analyzing each of the incoming data packets comprises analyzing on a packet-by-packet basis.

16. The method of claim 9, wherein none of the incoming data packets are stored nor reassembled.

17. A non-transitory computer-readable storage medium, having embodied thereon a program executable by a processor to perform a method for data pattern analysis, the method comprising:
- storing information regarding a plurality of data patterns, each data pattern associated with an identified type of content;
- receiving a plurality of incoming data packets over a network;
- inspecting the incoming data packets to identify a number of transitions that are present in a state diagram from one deterministic finite automaton (DFA) state of the state diagram at a current node to another DFA state at each of a plurality of child nodes in the network;
- dynamically allocating a first data structure for storing a plurality of DFA child states at the current node when the number of transitions is less than a predetermined threshold, wherein the plurality of child DFA states is linked in a chain in the first data structure;
- dynamically allocating a second data structure for storing the plurality of child DFA states at the current node when the number of transitions is greater than the predetermined threshold, wherein each of the plurality of child DFA states is directly accessible from the second data structure;
- identifying a match to at least one of the stored data patterns based on analyzing each of the incoming data packets by reference to the dynamically allocated data structure; and
- preventing at least a portion of data included in the data packets from being sent to a computer based on the identified match.

* * * * *